US012391330B2

(12) United States Patent
Isono (10) Patent No.: US 12,391,330 B2
(45) Date of Patent: Aug. 19, 2025

(54) WHEEL SUPPORT DEVICE (71) Applicant: AISIN CORPORATION, Aichi (JP)

(72) Inventor: Hiroshi Isono, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 18/758,736

(22) Filed: Jun. 28, 2024

(65) Prior Publication Data

US 2025/0100646 A1 Mar. 27, 2025

(30) Foreign Application Priority Data

Sep. 26, 2023 (JP) ................................ 2023-163614

(51) Int. Cl.
 *B62K 15/00* (2006.01)
 *B62K 5/02* (2013.01)
 *F03G 1/08* (2006.01)

(52) U.S. Cl.
 CPC .............. *B62K 15/008* (2013.01); *F03G 1/08* (2013.01); *B62K 5/02* (2013.01)

(58) Field of Classification Search
 CPC ........ F16H 3/60; B62K 15/006; B62K 15/008
 See application file for complete search history.

(56) References Cited

U.S. PATENT DOCUMENTS

| 6,752,400 | B2 * | 6/2004 | Nakatsukasa | ........ B62D 57/024 280/5.2 |
| 8,257,220 | B2 * | 9/2012 | Yang | ...................... B62M 11/00 475/287 |
| 8,298,112 | B2 * | 10/2012 | Takada | ...................... F16H 3/60 475/323 |
| 2011/0254238 | A1 | 10/2011 | Kanou | |
| 2016/0096620 | A1 * | 4/2016 | Kracke | .................. B64C 25/34 244/50 |

FOREIGN PATENT DOCUMENTS

WO 2010/092846 A1 8/2010

* cited by examiner

*Primary Examiner* — Huan Le
(74) *Attorney, Agent, or Firm* — Sughrue Mion, PLLC (57) ABSTRACT

A wheel support device includes: a planetary gear mechanism including a first rotating element rotatable about a rotation center axis, a second rotating element rotatable about the rotation center axis and configured to rotate in a reverse direction of the first rotating element, and a reaction force element configured to generate a reaction force against inputs from the first rotating element and the second rotating element; a first arm member including a first base end portion coupled to the first rotating element and a first tip end portion rotatably supporting a first wheel of a vehicle, and configured to rotate integrally with the first rotating element about the rotation center axis; and a second arm member including a second base end portion coupled to the second rotating element and a second tip end portion rotatably supporting a second wheel of the vehicle, and configured to rotate integrally with the second rotating element about the rotation center axis.

5 Claims, 12 Drawing Sheets

WHEEL SUPPORT DEVICE

CROSS REFERENCE TO RELATED APPLICATIONS

This application is based on and claims priority under 35 U.S.C. § 119 to Japanese Patent Application 2023-163614, filed on Sep. 26, 2023, the entire content of which is incorporated herein by reference.

TECHNICAL FIELD

This disclosure relates to a wheel support device.

BACKGROUND DISCUSSION

In the related art, there is a wheel support device that causes a pair of wheels to move in reverse directions by causing a pair of arm members connected to a pair of left and right wheels of a vehicle to rotate in the reverse directions. For example, there is known a wheel support device that causes a pair of wheels to move in the reverse directions by causing a pair of arm members connected to a pair of left and right wheels of a vehicle to rotate in reverse directions using a string-shaped member (for example, see WO2010/092846 (Reference 1)).

However, in the above related art, since a rotation center axis for causing the string-shaped member to move, that is, a rotation center axis of a mechanism for causing a pair of arm members to rotate in the reverse directions is different from a rotation center axis of the arm member, there is a problem that a size of the wheel support device is increased.

A need thus exists for a wheel support device which is not susceptible to the drawback mentioned above.

SUMMARY

According to an aspect of this disclosure, a wheel support device includes: a planetary gear mechanism including a first rotating element rotatable about a rotation center axis, a second rotating element rotatable about the rotation center axis and configured to rotate in a reverse direction of the first rotating element, and a reaction force element configured to generate a reaction force against inputs from the first rotating element and the second rotating element; a first arm member including a first base end portion coupled to the first rotating element and a first tip end portion rotatably supporting a first wheel of a vehicle, and configured to rotate integrally with the first rotating element about the rotation center axis; and a second arm member including a second base end portion coupled to the second rotating element and a second tip end portion rotatably supporting a second wheel of the vehicle, and configured to rotate integrally with the second rotating element about the rotation center axis.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments and modifications disclosed here will be described with reference to the drawings. Configurations of the embodiments and modifications described below, as well as operational effects brought about by the configurations, are merely examples, and are not limited to the following description.

The drawings are schematic, and dimensional relationships of elements, ratios of elements, and the like may be different from actual ones. In addition, the drawings also include portions having different dimensional relationships and ratios from each other. In addition, in the present specification, an initial number is used only for distinguishing parts, members, portions, positions, directions, and the like, and does not indicate an order or priority.

First Embodiment

Figure 1:
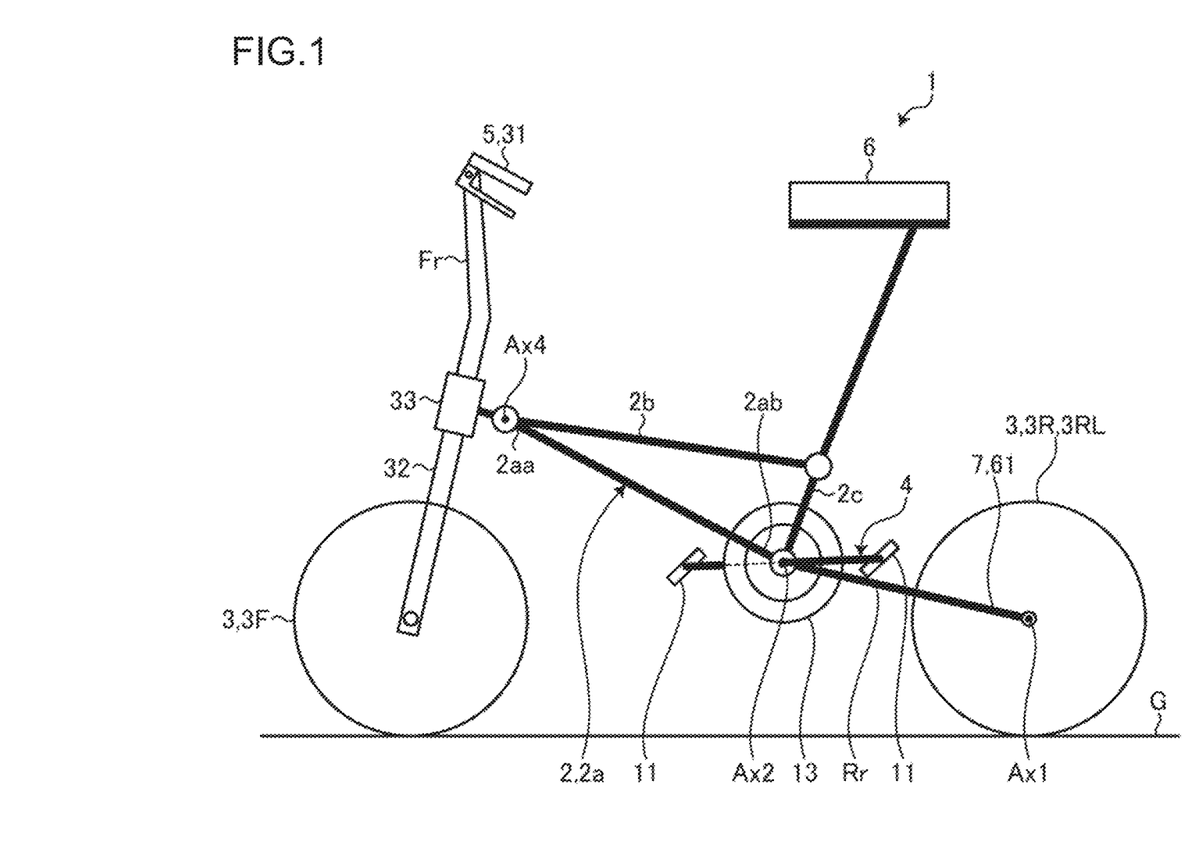
FIG. 1 is an exemplary and schematic side view showing a schematic configuration of a vehicle according to a first embodiment, and is a view showing a developed state.
Figure 2:
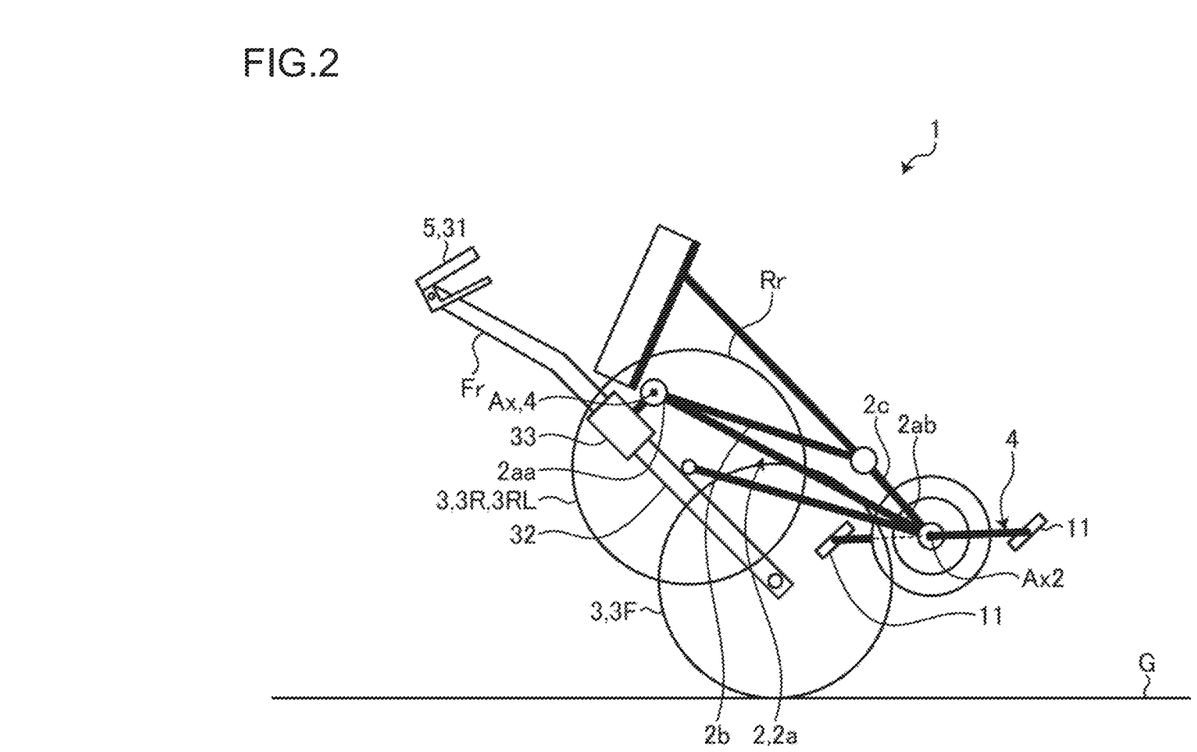
FIG. 2 is an exemplary and schematic side view showing the schematic configuration of the vehicle according to the first embodiment, and is a view showing a folded state.

FIG. 1 is an exemplary and schematic side view showing a schematic configuration of a vehicle 1 according to a first embodiment, and is a view showing a developed state. FIG. 2 is an exemplary and schematic side view showing the schematic configuration of the vehicle 1 according to the first embodiment, and is a view showing a folded state.

The vehicle 1 shown in FIGS. 1 and 2 has a configuration capable of manual travelling, electrically assisted travelling, or completely electrical-driven travelling. The vehicle 1 is an example of an electrically assisted tricycle.

The vehicle 1 is deformable into the developed state shown in FIG. 1 and the folded state shown in FIG. 2. That is, the vehicle 1 is a foldable vehicle. The vehicle 1 can travel on a ground G (road surface) in the developed state. In the vehicle 1, in the folded state of the vehicle 1, at least a part of a front wheel 3F and at least a part of rear wheels 3R are aligned in an axial direction of a first rotation center axis Ax1 to be described later.

Figure 3:
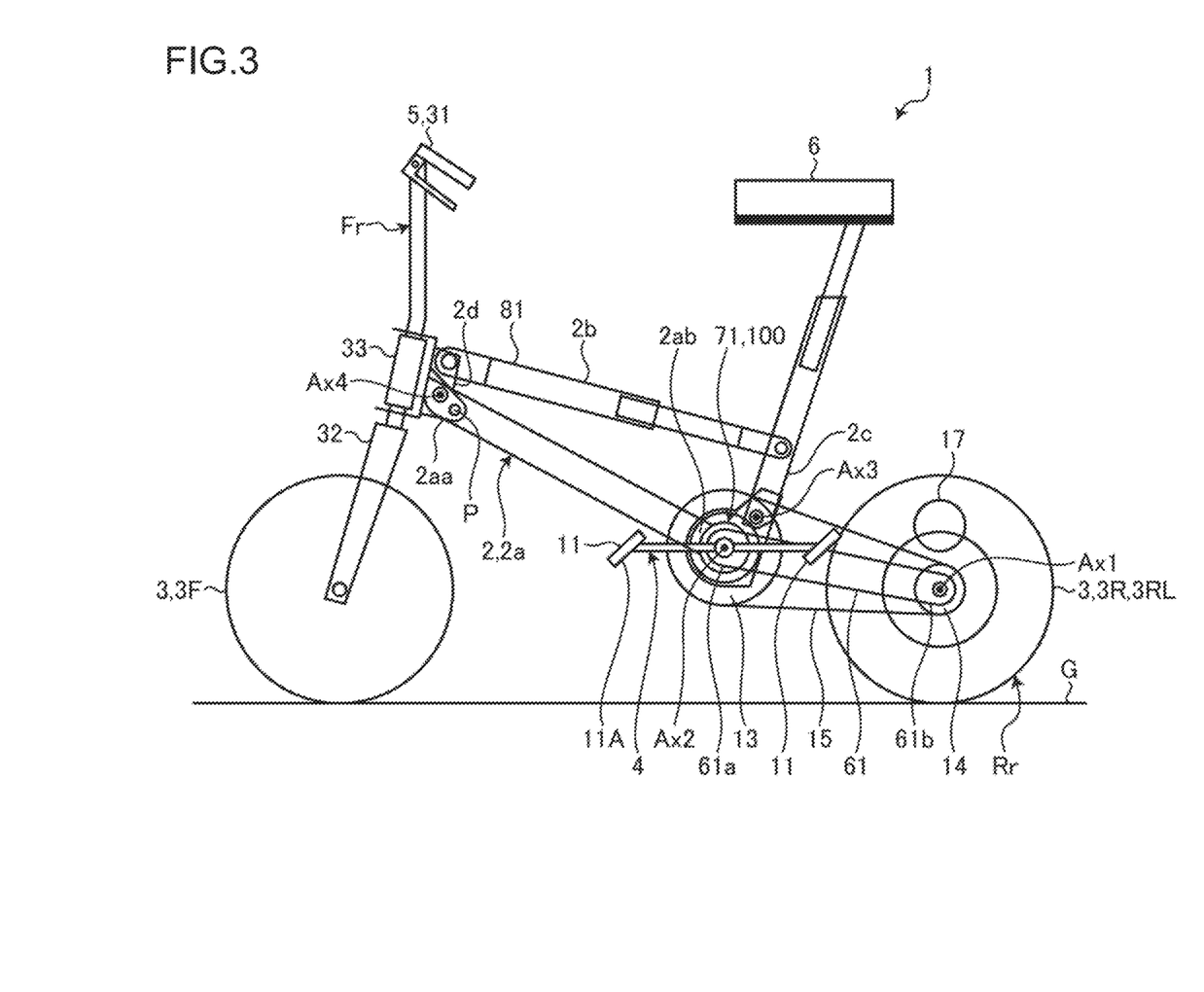
FIG. 3 is an exemplary and schematic side view showing a detailed configuration of the vehicle according to the first embodiment.
Figure 4:
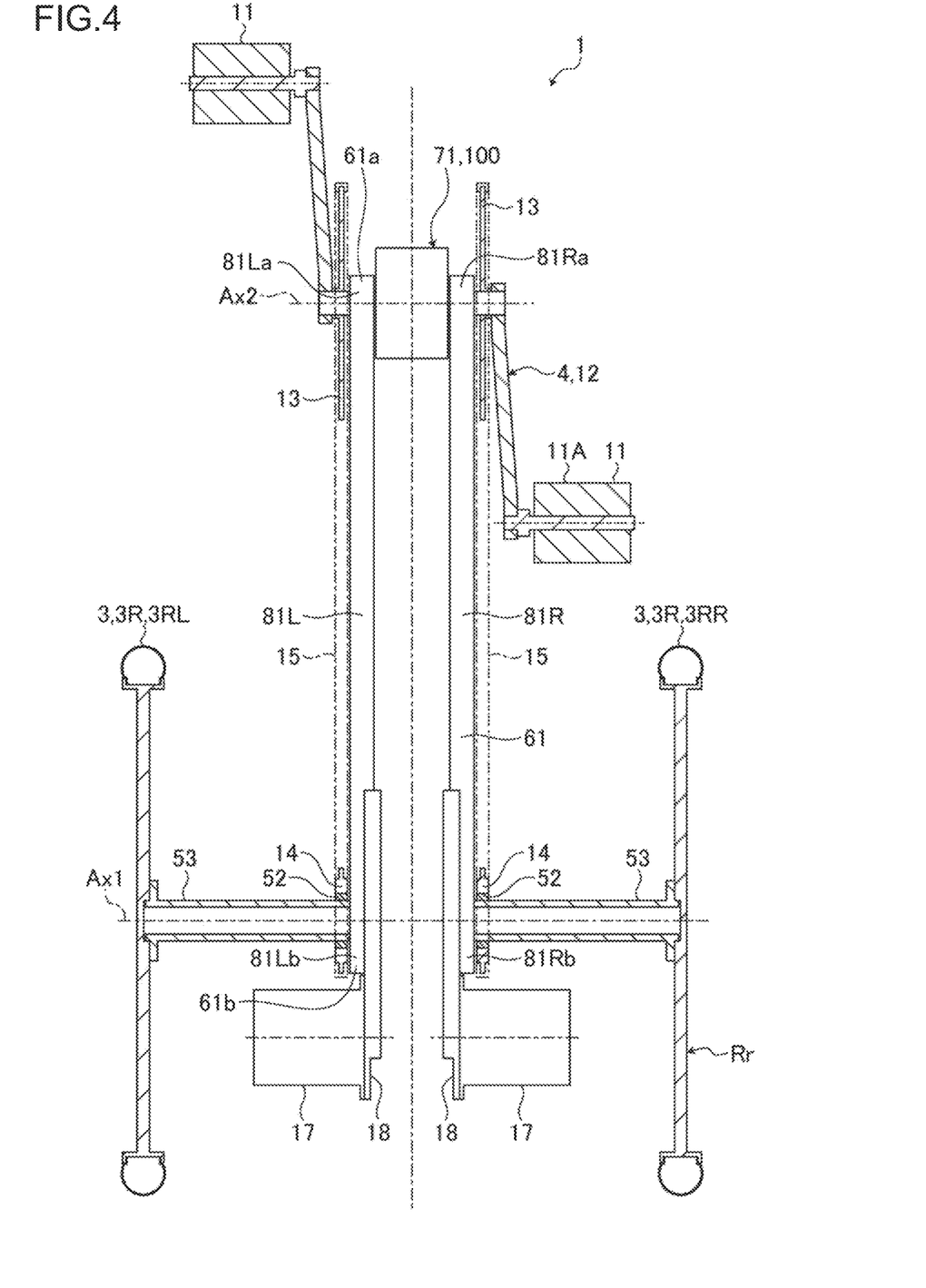
FIG. 4 is an exemplary and schematic cross-sectional view showing a drive system of the vehicle according to the first embodiment.

The vehicle 1 will be described in detail. FIG. 3 is an exemplary and schematic side view showing a detailed configuration of the vehicle 1 according to the first embodiment. FIG. 4 is an exemplary and schematic cross-sectional view showing a drive system of the vehicle 1 according to the first embodiment. As shown in FIGS. 3 and 4, the vehicle 1 includes a frame 2, a plurality of (for example, three) wheels 3, a drive mechanism 4, a steering portion 5, and a seat portion 6.

The three wheels 3 are one front wheel 3F and two rear wheels 3R (3RL, 3RR). The three wheels 3 are rotatably supported by the frame 2. Specifically, the front wheel 3F is supported by the frame 2 via the steering portion 5. The two rear wheels 3R are supported by the frame 2 via arm members 81R and 81L, respectively. The two rear wheels 3RL and 3RR are provided at an interval in a left-right direction of the vehicle 1. The two rear wheels 3RL and 3RR are fixed to two shafts 53, and rotate integrally with the two shafts 53 about the first rotation center axis Ax1. The left-right direction of the vehicle 1 is also referred to as a width direction (vehicle width direction). The two rear wheels 3R are examples of two wheels.

The drive mechanism 4 rotationally drives the two rear wheels 3RL and 3RR. The drive mechanism 4 includes left and right two pedals 11, two pedal arm members 12, a drive gear 13 (front sprocket), a driven gear 14 (rear sprocket), and a chain 15. The chain 15 is stretched between the drive gear 13 and the driven gear 14. The drive gear 13 and the driven gear 14 can transmit power by the chain 15, and a motor 17 is connected to the driven gear 14 via a transmission unit 18. The drive gear 13 is an example of a drive portion, the driven gear 14 is an example of a driven portion, and the chain 15 is an example of a connecting member. The drive portion, the driven portion, and the connecting member are not limited to those described above. For example, the drive portion and the driven portion may be both pulleys, and the connecting member may be a belt.

The two pedals 11 are provided so as to be rotatable about a support portion rotation center axis Ax2. Specifically, the two pedals 11 are connected to the drive gear 13 via the two pedal arm members 12. The drive gear 13 is supported by the frame 2 (base frame 2a) so as to be rotatable about the support portion rotation center axis Ax2. Specifically, the drive gear 13 is supported by the frame 2 (base frame 2a) via a rotation support portion 71 to be described later. The pedals 11 cause the drive gear 13 to rotate by being rotated about the support portion rotation center axis Ax2 by human power of a rider. The support portion rotation center axis Ax2 is along the first rotation center axis Ax1.

The driven gear 14 is coupled to the rear wheel 3R via the shaft 53, and rotates integrally with the rear wheel 3R about the first rotation center axis Ax1. Specifically, the driven gear 14 is connected to the shafts 53 via a one-way clutch 52. The one-way clutch 52 transmits a rotational force of the drive gear 13 rotating in a first rotational direction, which is a rotational direction of the drive gear 13 when the vehicle 1 moves forward, to the rear wheel 3R via the shaft 53. On the other hand, the one-way clutch 52 interrupts transmission of a rotational force of the rear wheel 3R to the driven gear 14. Specifically, when the drive gear 13 and the driven gear 14 rotate in the first rotational direction, the one-way clutch 52 connects the driven gear 14 and the shaft 53 to cause the driven gear 14 and the shaft 53 to integrally rotate. When the driven gear 14 rotates in a direction opposite to the first rotational direction relative to the shaft 53, the one-way clutch 52 does not connect the driven gear 14 and the shaft 53, and causes the driven gear 14 and the shaft 53 (rear wheel 3R) to rotate relative to each other. That is, in a case where a rotation speed of the shaft 53 is greater than a rotation speed of the driven gear 14 when the vehicle 1 moves forward, the one-way clutch 52 releases the connection between the shaft 53 and the driven gear 14.

In the above configuration, a rotational motion of the pedal 11 is converted into a rotational motion of the rear wheels 3R via the drive gear 13, the chain 15, and the driven gear 14. The two pedals 11, the two pedal arm members 12, and a shaft 73 constitute a crank pedal 11A. That is, the crank pedal 11A is provided to be rotatable about the support portion rotation center axis Ax2, and causes the rear wheels 3R to rotate about the first rotation center axis Ax1 via the chain 15. The crank pedal 11A is an example of a manual drive device.

The motor 17 applies a rotational force (assist force) in accordance with an operation force (pressing force) acting on the pedals 11 to the driven gear 14 via the transmission unit 18. Accordingly, when the vehicle 1 travels, the rear wheels 3RL and 3RR are rotationally driven by the operation force (pressing force) acting on the pedals 11 and the force transmitted from the motor 17. The motor 17 is rotated by electric power supplied from a battery (not shown).

In addition, the drive mechanism 4 has a braking function. The drive mechanism 4 generates a braking force by a brake device by operating a brake operation member. At this time, the drive mechanism 4 can also generate the braking force by a regenerative operation of the motor 17.

The vehicle 1 can switch among a manual travel mode in which the vehicle 1 travels only by an operation of the drive mechanism 4, an assist travel mode driven by the motor 17, and an electric travel mode in which the vehicle 1 travels only by the driving of the motor 17 by causing a clutch to interpose between the motor 17 and the transmission unit 18, or the like. The vehicle 1 may travel only by manual drive without the motor 17 and the transmission unit 18.

As shown in FIG. 3, the steering portion 5 includes a handle 31 and a front support portion 32 coupled to the handle 31. The front support portion 32 rotatably supports the front wheel 3F. The steering portion 5 is rotatably connected to the frame 2 via a connecting portion 33.

The frame 2 includes a base frame 2a, an upper member 2b, a rear connecting member 2c, and a front connecting member 2d. The base frame 2a extends in a front-rear direction of the vehicle 1. The base frame 2a has a first front end portion 2aa and a first rear end portion 2ab. The upper member 2b extends in the front-rear direction of the vehicle 1 and is positioned above the base frame 2a. Specifically, the upper member 2b is inclined with respect to the front-rear direction of the vehicle 1 so as to be directed downward toward a rear side. The base frame 2a and the upper member 2b are connected via the rear connecting member 2c and the front connecting member 2d. The base frame 2a, the upper member 2b, the rear connecting member 2c, and the front connecting member 2d are rotatably connected to one another. The upper member 2b is expandable and contractible. The upper member 2b has a lock mechanism that locks expansion and contraction.

The seat portion 6 is supported by the rear connecting member 2c in a manner capable of adjusting a height.

The vehicle 1 according to the present embodiment includes a front portion Fr, a rear portion Rr, and the rotation support portion 71.

The front portion Fr includes the front support portion 32, the front wheel 3F, and the handle 31. The front support portion 32 is coupled to the first front end portion 2aa of the base frame 2a. The front support portion 32 rotatably supports the front wheel 3F. The front support portion 32 supports the handle 31.

The front portion Fr is connected to the first front end portion 2aa of the base frame 2a so as to be rotatable about a front portion rotation center axis Ax4 along the first rotation center axis Ax1. The front portion Fr is rotatable about the front portion rotation center axis Ax4 in a forward-rotation direction which is a rotational direction of the rear wheels 3R when the vehicle 1 moves forward from the developed state.

The rear portion Rr includes a rear support portion 61 and the rear wheels 3R. The rear support portion 61 includes a second front end portion 61a and a second rear end portion 61b. The rear portion Rr extends rearward in the front-rear direction of the vehicle 1 from the first rear end portion 2ab of the base frame 2a in the developed state.

The rear wheel 3R is supported by the second rear end portion 61b of the rear support portion 61 so as to be rotatable about the first rotation center axis Ax1 along the width direction of the vehicle 1.

The rotation support portion 71 connects the rear portion Rr to the first rear end portion 2ab of the base frame 2a so as to be rotatable about the support portion rotation center axis Ax2 along the first rotation center axis Ax1. The rotation support portion 71 generates a reaction force against a load from the rear portion Rr in the developed state. The rotation support portion 71 is capable of moving the rear wheels 3R from a position behind the first rear end portion 2ab in the developed state in the front-rear direction to a position of the folded state on a first front end portion 2aa side of the base frame 2a with respect to the first rear end portion 2ab of the base frame 2a. Details of the rotation support portion 71 will be described later.

The seat portion 6 is connected to the first rear end portion 2ab of the base frame 2a so as to be rotatable about a seat portion rotation center axis Ax3 along the first rotation center axis Ax1. In the developed state, the seat portion 6 extends from the base frame 2a obliquely upward to the rear side of the vehicle 1. The seat portion 6 is rotatable about the seat portion rotation center axis Ax3 in the forward-rotation direction which is the rotational direction of the rear wheels 3R when the vehicle 1 moves forward from the developed state.

In addition, the front portion Fr is connected to the first front end portion 2aa of the base frame 2a so as to be rotatable about the front portion rotation center axis Ax4 along the first rotation center axis Ax1. The front portion Fr is rotatable about the front portion rotation center axis Ax4 in the forward-rotation direction which is the rotational direction of the rear wheels 3R when the vehicle 1 moves forward from the developed state.

The vehicle 1 includes an interlocking mechanism 81. The interlocking mechanism 81 causes the rotation of the seat portion 6 about the seat portion rotation center axis Ax3 and the rotation of the front portion Fr about the front portion rotation center axis Ax4 to be interlocked. The interlocking mechanism 81 is a link mechanism including the base frame 2a, the upper member 2b, the rear connecting member 2c, and the front connecting member 2d.

As shown in FIG. 4, the rear portion Rr includes the arm member 81R and the arm member 81L. The arm member 81R and the arm member 81L are separated from each other in an axial direction of the support portion rotation center axis Ax2, that is, an axial direction of the shaft 73. The arm member 81R includes a base end portion 81Ra supported by the rotation support portion 71 and a tip end portion 81Rb rotatably supporting the rear wheel 3RR which is a first rear wheel. The arm member 81L includes a base end portion 81La supported by the rotation support portion 71 and a tip end portion 81Lb rotatably supporting the rear wheel 3RL which is a second rear wheel. The arm member 81R and the arm member 81L are rotatable about the support portion rotation center axis Ax2.

The rotation support portion 71, the arm member 81R, and the arm member 81L constitute a wheel support device 100. The wheel support device 100 functions as a suspension.

Figure 5:
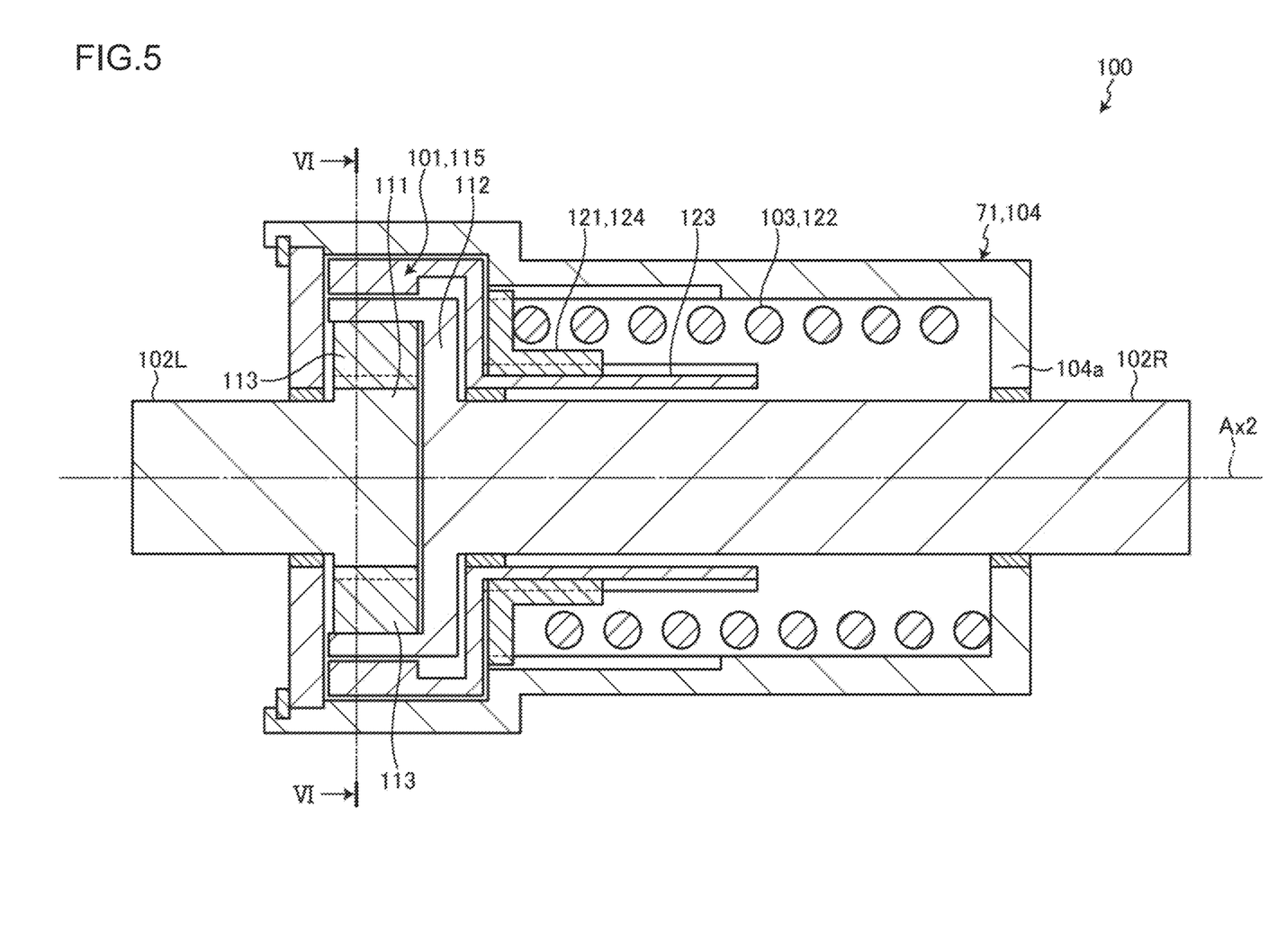
FIG. 5 is an exemplary and schematic cross-sectional view showing a wheel support device of the vehicle according to the first embodiment.
Figure 6:
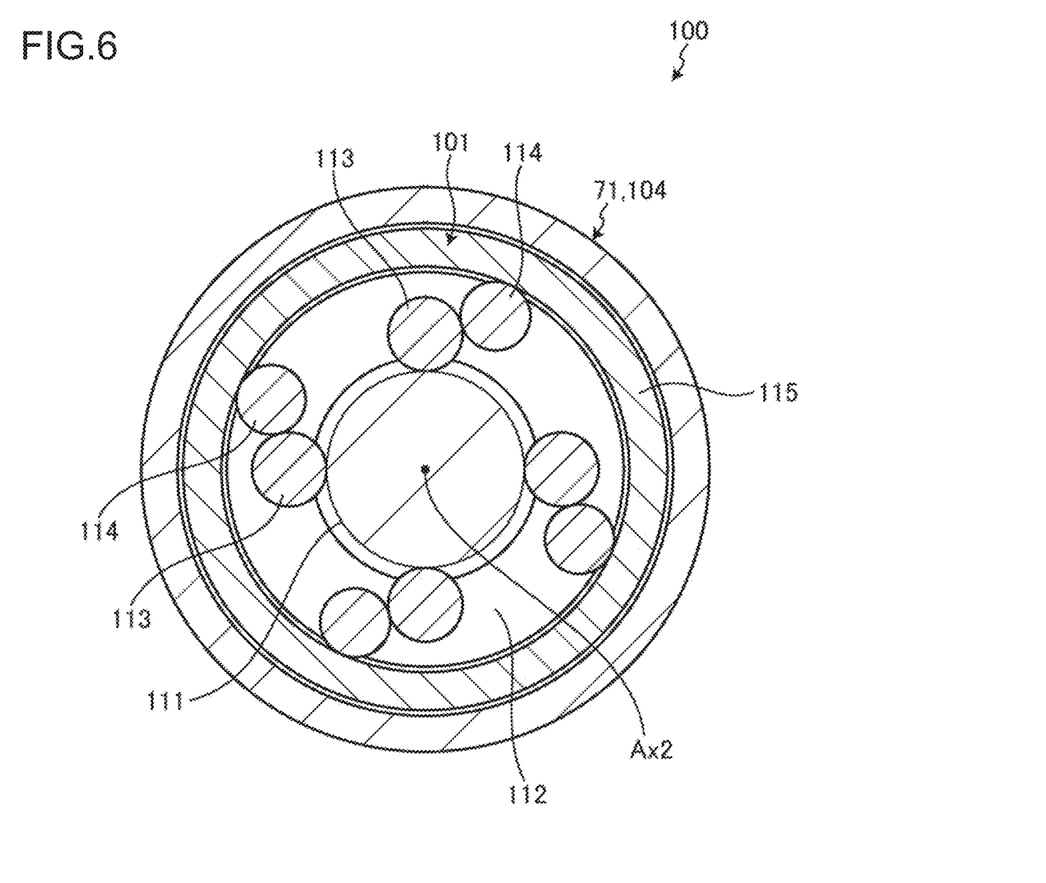
FIG. 6 is a cross-sectional view taken along a line VI-VI in FIG. 5.

FIG. 5 is an exemplary and schematic cross-sectional view showing the wheel support device of the vehicle according to the first embodiment. FIG. 6 is a cross-sectional view taken along a line VI-VI in FIG. 5. As shown in FIGS. 5 and 6, the rotation support portion 71 includes a planetary gear mechanism 101 capable of causing the arm member 81R and the arm member 81L to rotate in reverse directions to each other, rotating members 102L and 102R, a reaction force mechanism 103, and a case 104.

The case 104 is fixed to the base frame 2a. The case 104 accommodates the planetary gear mechanism 101 and the reaction force mechanism 103.

The rotating members 102L and 102R are rotatable about the support portion rotation center axis Ax2. The rotating members 102L and 102R are disposed side by side in the axial direction of the support portion rotation center axis Ax2. The rotating members 102L and 102R are, for example, shafts. The base end portion 81La of the arm member 81L is fixed to the rotating member 102L, and the rotating member 102L and the arm member 81L integrally rotate about the support portion rotation center axis Ax2. The base end portion 81Ra of the arm member 81R is fixed to the rotating member 102R, and the rotating member 102R and the arm member 81R integrally rotate about the support portion rotation center axis Ax2.

The planetary gear mechanism 101 is, for example, a double-pinion gear type planetary gear mechanism. Specifically, the planetary gear mechanism 101 includes a sun gear 111, a planetary carrier 112, a plurality of inner pinion gears 113, a plurality of outer pinion gears 114, and a ring gear 115.

The sun gear 111 is provided integrally with the rotating member 102L, and rotates integrally with the rotating member 102L. That is, the sun gear 111 is coupled to the arm member 81L via the rotating member 102L, and rotates integrally with the arm member 81L.

The planetary carrier 112 is provided integrally with the rotating member 102R, and rotates integrally with the rotating member 102R. That is, the planetary carrier 112 is coupled to the arm member 81R via the rotating member 102R, and rotates integrally with the arm member 81R.

The plurality of inner pinion gears 113 and the plurality of outer pinion gears 114 are rotatably supported by the planetary carrier 112, and rotate integrally with the planetary carrier 112. The inner pinion gears 113 mesh with the sun gear 111. The outer pinion gears 114 mesh with the inner pinion gears 113 and the ring gear 115.

In the planetary gear mechanism 101 having the above configuration, the sun gear 111 and the planetary carrier 112 are rotatable in reverse directions. That is, the planetary gear mechanism 101 causes the arm member 81R and the arm member 81L to rotate in the reverse directions (opposite directions) to each other. For example, when one of the arm member 81R and the arm member 81L is rotated in one direction about the support portion rotation center axis Ax2 by an external force, the planetary gear mechanism 101 causes the other one of the arm member 81R and the arm member 81L to rotate in the other direction about the support portion rotation center axis Ax2. The planetary gear mechanism 101 supports the arm members 81L and 81R such that the arm members 81L and 81R are rotatable by 180 degrees or more about the support portion rotation center axis Ax2. The planetary gear mechanism 101 is also referred to as a reversing mechanism. The arm member 81L is an example of a first arm member, and the arm member 81R is an example of a second arm member. The sun gear 111 is an example of a first rotating element, the planetary carrier 112 is an example of a second rotating element, and the ring gear 115 is an example of a reaction force element.

The reaction force mechanism 103 includes a motion conversion mechanism 121 and an elastic member 122. The motion conversion mechanism 121 includes a rotating member 123 and a linear motion member 124. The rotating member 123 is provided integrally with the ring gear 115, and rotates integrally with the ring gear 115. The rotating member 123 has a cylindrical shape about the support portion rotation center axis Ax2, and has a male screw (helical spline) formed on an outer peripheral portion thereof. The linear motion member 124 has a cylindrical shape about the support portion rotation center axis Ax2, and is supported by the case 104 so as to linearly move in the axial direction of the support portion rotation center axis Ax2. In addition, a female screw (helical spline) that meshes with the male screw of the rotating member 123 is formed on an inner peripheral portion of the linear motion member 124. The elastic member 122 is interposed between the linear motion member 124 and a wall 104a of the case 104. The elastic member 122 is a coil spring.

In the reaction force mechanism 103 having the above configuration, a rotational motion of the ring gear 115 is converted into a linear motion of the linear motion member 124 by the rotating member 123 and the linear motion member 124. When the linear motion member 124 moves in a direction approaching the wall 104a of the case 104, the elastic member 122 sandwiched between the linear motion member 124 and the wall 104a is compressed to generate a reaction force (elastic force). The reaction force mechanism 103 generates the reaction force against the load from the rear wheels 3R in the developed state. Specifically, when the ring gear 115 is rotated by the two arm members 81R and 81L rotating in a direction in which the two tip end portions 81Rb and 81Lb of the arm members 81R and 81L and the two rear wheels 3R are directed upward in an upper-lower direction of the vehicle 1, the reaction force mechanism 103 generates the reaction force by being compressed by the linear motion member 124 that linearly moves in accordance with the rotation of the ring gear 115. This reaction force is transmitted to the arm members 81R and 81L.

A preload is set for the elastic member 122. That is, the elastic member 122 is provided in a compressed state to which the load is applied in advance. When a rotational torque input to the ring gear 115 (reaction force element) is less than a threshold, the linear motion member 124 is stopped by the elastic force of the elastic member 122. Accordingly, for example, the state shown in FIG. 3 is maintained. When the rotational torque input to the ring gear 115 is equal to or greater than the threshold, the linear motion member 124 linearly moves against the elastic force of the elastic member 122. The preload may not be set for the elastic member 122.

The wheel support device 100 is capable of moving the rear wheels 3R from the position (FIG. 1 and FIG. 3) behind the first rear end portion 2ab in the developed state in the front-rear direction to the position (FIG. 2) of the folded state on the first front end portion 2aa side of the base frame 2a with respect to the first rear end portion 2ab of the base frame 2a. Specifically, the wheel support device 100 can move the left and right rear wheels 3R to the position of the folded state by causing the arm member 81R and the arm member 81L to rotate in the reverse directions. The planetary gear mechanism 101 is also referred to as a lean mechanism.

In the vehicle 1 having the above configuration, in the developed state, the frame 2 of each part cannot be deformed by a lock pin P, and the frame 2 can be deformed by removing the lock pin P, and thus the vehicle 1 can be folded.

As described above, in the present embodiment, the wheel support device 100 includes the planetary gear mechanism 101, the arm member 81L (first arm member), and the arm member 81R (second arm member). The planetary gear mechanism 101 includes the sun gear 111 (first rotating element), the planetary carrier 112 (second rotating element), and the ring gear 115 (reaction force element). The sun gear 111 is rotatable about the support portion rotation center axis Ax2 (rotation center axis). The planetary carrier 112 is rotatable about the support portion rotation center axis Ax2 and rotates in the reverse direction of the sun gear 111. The ring gear 115 generates a reaction force against inputs from the sun gear 111 and the planetary carrier 112. The arm member 81L includes the base end portion 81La (first base end portion) coupled to the sun gear 111, and the tip end portion 81Lb (first tip end portion) rotatably supporting the rear wheel 3RL (first wheel) of the vehicle 1, and rotates integrally with the sun gear 111 about the support portion rotation center axis Ax2. The arm member 81R includes the base end portion 81Ra (second base end portion) coupled to the planetary carrier 112, and the tip end portion 81Rb (second tip end portion) rotatably supporting the rear wheel 3RR (second wheel) of the vehicle 1, and rotates integrally with the planetary carrier 112 about the support portion rotation center axis Ax2.

According to such a configuration, since the support portion rotation center axis Ax2 of the planetary gear mechanism 101, which is a mechanism for causing the arm member 81L and the arm member 81R to rotate in the reverse directions, and the support portion rotation center axis Ax2 of the arm member 81L and the arm member 81R are the same, it is possible to prevent an increase in a size of the wheel support device 100.

The wheel support device 100 includes the reaction force mechanism 103. The ring gear 115 rotates about the support portion rotation center axis Ax2 in conjunction with the rotation of the planetary carrier 112 and the sun gear 111. The reaction force mechanism 103 includes the linear motion member 124 that linearly moves in the axial direction of the support portion rotation center axis Ax2 in accordance with the rotation of the ring gear 115, and the elastic member 122 that generates the reaction force in accordance with the linear motion of the linear motion member 124.

According to this configuration, a load (impact) input to the wheel support device 100 can be absorbed by the elastic force of the elastic member 122.

The first rotating element is the sun gear 111, and the second rotating element is the planetary carrier 112.

According to such a configuration, for example, a length of the planetary gear mechanism 101, which is the reversing mechanism, in the axial direction of the support portion rotation center axis Ax2 is easily shortened as compared with a case where a bevel gear reversing mechanism is adopted as the reversing mechanism.

Further, the reaction force mechanism 103 has a tubular shape about the support portion rotation center axis Ax2, and includes the rotating member 123 (tubular member) that rotates integrally with the ring gear 115. The linear motion member 124 is connected to the ring gear 115 via the rotating member 123, and linearly moves in the axial direction of the support portion rotation center axis Ax2 in accordance with the rotation of the rotating member 123 and the ring gear 115.

According to such a configuration, the reaction force can be generated by a relatively simple configuration, and the size of the wheel support device 100 can be reduced.

In addition, the preload is set for the elastic member 122. When the rotational torque input to the ring gear 115 is less than the threshold, the linear motion member 124 is stopped by the elastic force of the elastic member 122, and when the rotational torque input to the ring gear 115 is equal to or greater than the threshold, the linear motion member 124 linearly moves.

According to such a configuration, an expansion and contraction length (stroke) of the elastic member 122 is likely to be shortened, and a length of the wheel support device 100 in the axial direction of the support portion rotation center axis Ax2 is likely to be shortened.

Second Embodiment

Figure 7:
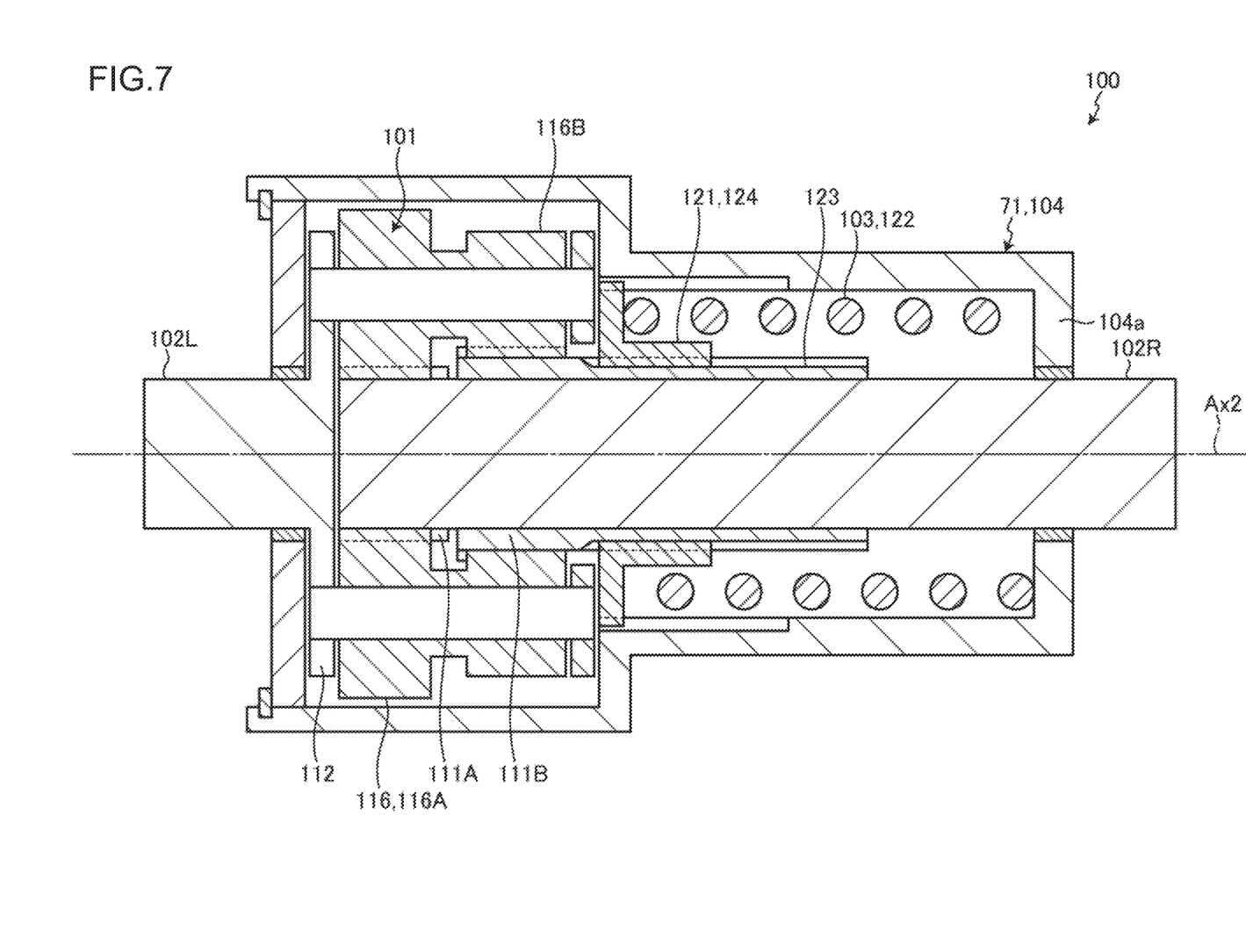
FIG. 7 is an exemplary and schematic cross-sectional view showing a wheel support device according to a second embodiment.

FIG. 7 is an exemplary and schematic cross-sectional view showing a wheel support device according to a second embodiment. The present embodiment is different from the first embodiment mainly in the configuration of the planetary gear mechanism 101 and the configuration of the reaction force mechanism 103.

The planetary gear mechanism 101 according to the present embodiment is a 2KH-type planetary gear mechanism, and includes a first sun gear 111A (first rotating element), a second sun gear 111B (reaction force element), the planetary carrier 112 (second rotating element), a plurality of pinion gears 116 (hereinafter also referred to as first pinion gears 116A), and a second pinion gear 116B that rotates integrally with the first pinion gears 116A. The first sun gear 111A is provided in the rotating member 102R, and rotates integrally with the rotating member 102R. The planetary carrier 112 is provided in the rotating member 102L, and rotates integrally with the rotating member 102L. The first pinion gears 116A mesh with the first sun gear 111A. The second pinion gear 116B meshes with the second sun gear 111B.

The motion conversion mechanism 121 of the reaction force mechanism 103 according to the present embodiment includes the rotating member 123 and the linear motion member 124.

The rotating member 123 is provided integrally with the second sun gear 111B, and rotates integrally with the second sun gear 111B. The rotating member 123 has the cylindrical shape about the support portion rotation center axis Ax2, and has the male screw (helical spline) formed on the outer peripheral portion thereof. The linear motion member 124 has the cylindrical shape about the support portion rotation center axis Ax2, and is supported by the case 104 so as to linearly move in the axial direction of the support portion rotation center axis Ax2. In addition, the female screw (helical spline) that meshes with the male screw of the rotating member 123 is formed the inner peripheral portion of the linear motion member 124. The elastic member 122 is interposed between the linear motion member 124 and the wall 104a of the case 104. The elastic member 122 is the coil spring.

In the reaction force mechanism 103 having the above configuration, a rotational motion of the second sun gear 111B is converted into the linear motion of the linear motion member 124 by the rotating member 123 and the linear motion member 124. When the linear motion member 124 moves in the direction approaching the wall 104a of the case 104, the elastic member 122 sandwiched between the linear motion member 124 and the wall 104a is compressed to generate the reaction force (elastic force). The reaction force mechanism 103 generates the reaction force against the load from the rear wheels 3R in the developed state.

The preload is set for the elastic member 122. That is, the elastic member 122 is provided in the compressed state to which the load is applied in advance. When a rotational torque input to the second sun gear 111B (reaction force element) is less than the threshold, the linear motion member 124 is stopped by the elastic force of the elastic member 122, and when the rotational torque input to the second sun gear 111B is equal to or greater than the threshold, the linear motion member 124 linearly moves against the elastic force of the elastic member 122. The preload may not be set for the elastic member 122.

Third Embodiment

Figure 8:
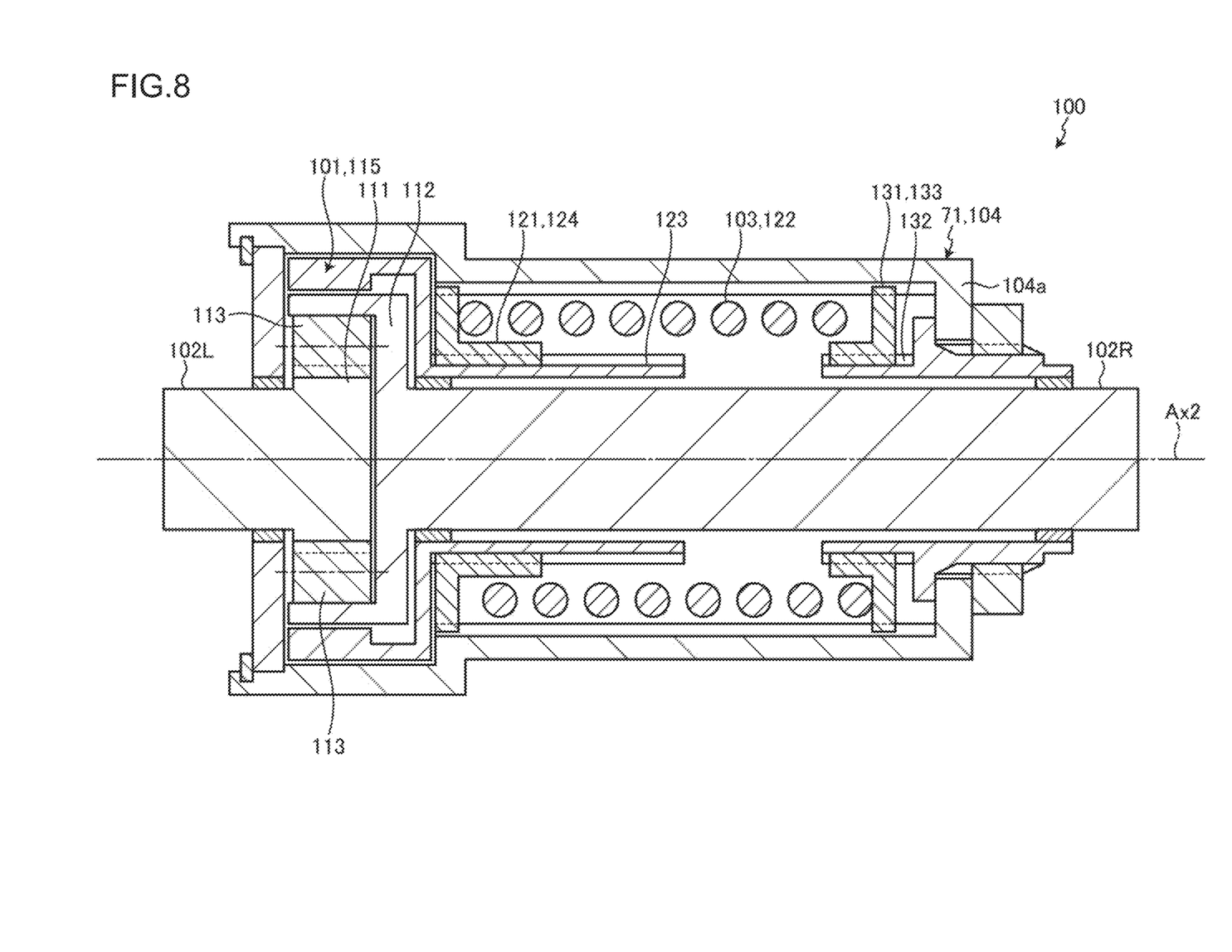
FIG. 8 is an exemplary and schematic cross-sectional view showing a wheel support device according to a third embodiment.

FIG. 8 is an exemplary and schematic cross-sectional view showing a wheel support device according to a third embodiment. The present embodiment is different from the first embodiment mainly in that the reaction force mechanism 103 includes a preload adjustment mechanism 131.

The preload adjustment mechanism 131 includes a support member 132 and a linear motion member 133. The support member 132 is fixed to the case 104. The support member 132 has a cylindrical shape about the support portion rotation center axis Ax2, and has a male screw (helical spline) formed on an outer peripheral portion thereof. The linear motion member 133 has a cylindrical shape about the support portion rotation center axis Ax2, and is supported by the case 104 so as to linearly move in the axial direction of the support portion rotation center axis Ax2. In addition, a female screw (helical spline) that meshes with the male screw of the support member 132 is formed on an inner peripheral portion of the linear motion member 133. The elastic member 122 is interposed between the linear motion member 124 and the linear motion member 133.

In the above configuration, a compression amount, that is, the preload of the elastic member 122 can be adjusted by causing the linear motion member 133 to move in the axial direction to change a position of the linear motion member 133.

Fourth Embodiment

Figure 9:
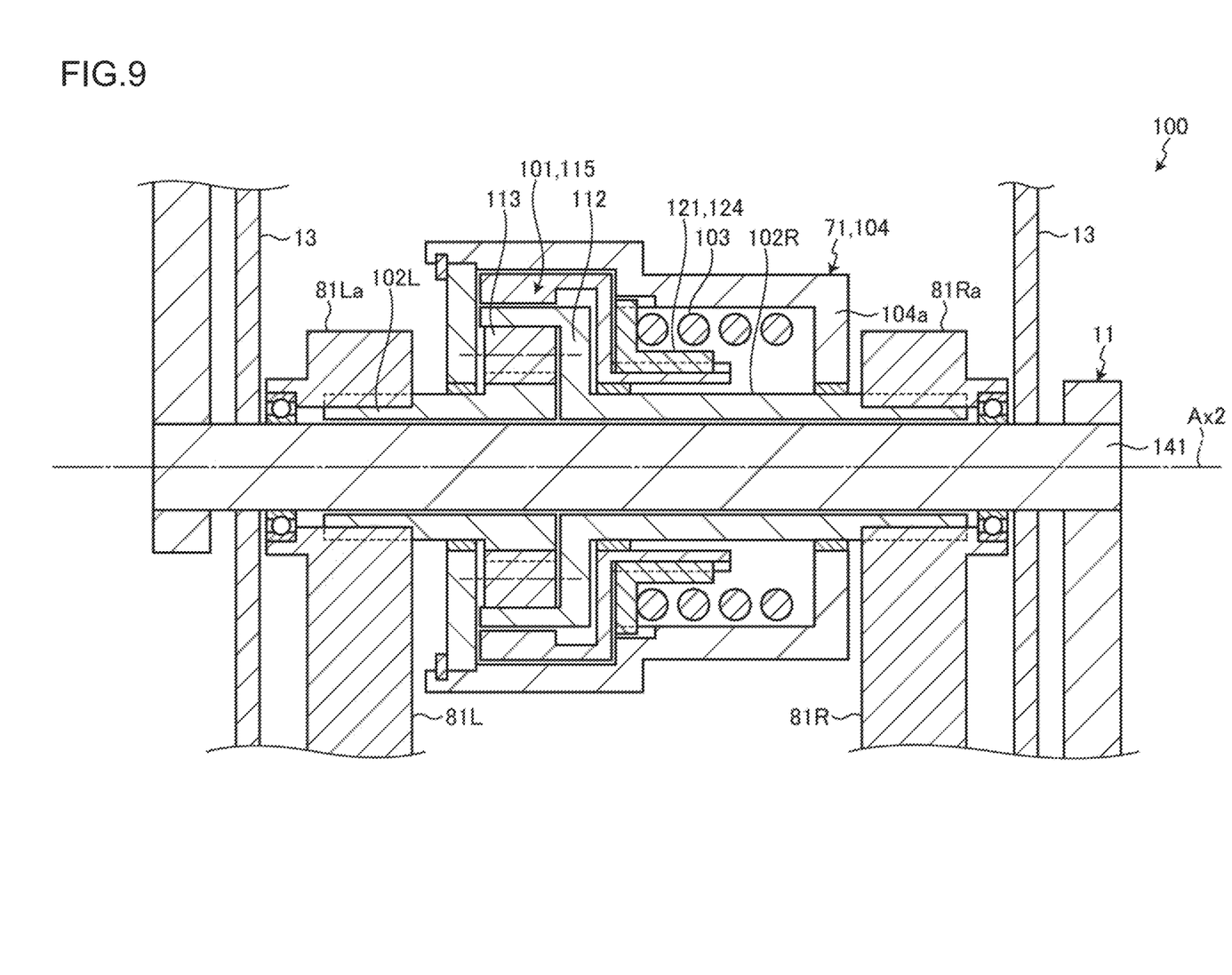
FIG. 9 is an exemplary and schematic cross-sectional view showing a wheel support device according to a fourth embodiment.

FIG. 9 is an exemplary and schematic cross-sectional view showing a wheel support device according to a fourth embodiment. The present embodiment is different from the first embodiment mainly in that a pair of arm members 81L and 81R are supported by a single shaft 141, and the shaft 141 penetrates the rotation support portion 71.

The rotating members 102L and 102R according to the present embodiment have cylindrical shapes about the support portion rotation center axis Ax2, the shaft 141 is inserted therein, and the rotating members 102L and 102R are provided to be rotatable with respect to the shaft 141.

The rotating members 102L and 102R are disposed side by side in the axial direction of the support portion rotation center axis Ax2. The rotating members 102L and 102R are, for example, shafts. The tip end portion 81Lb of the arm member 81L is fixed to the rotating member 102L, and the rotating member 102L and the arm member 81L integrally rotate about the support portion rotation center axis Ax2. The tip end portion 81Rb of the arm member 81R is fixed to the rotating member 102R, and the rotating member 102R and the arm member 81R integrally rotate about the support portion rotation center axis Ax2.

Fifth Embodiment

Figure 10:
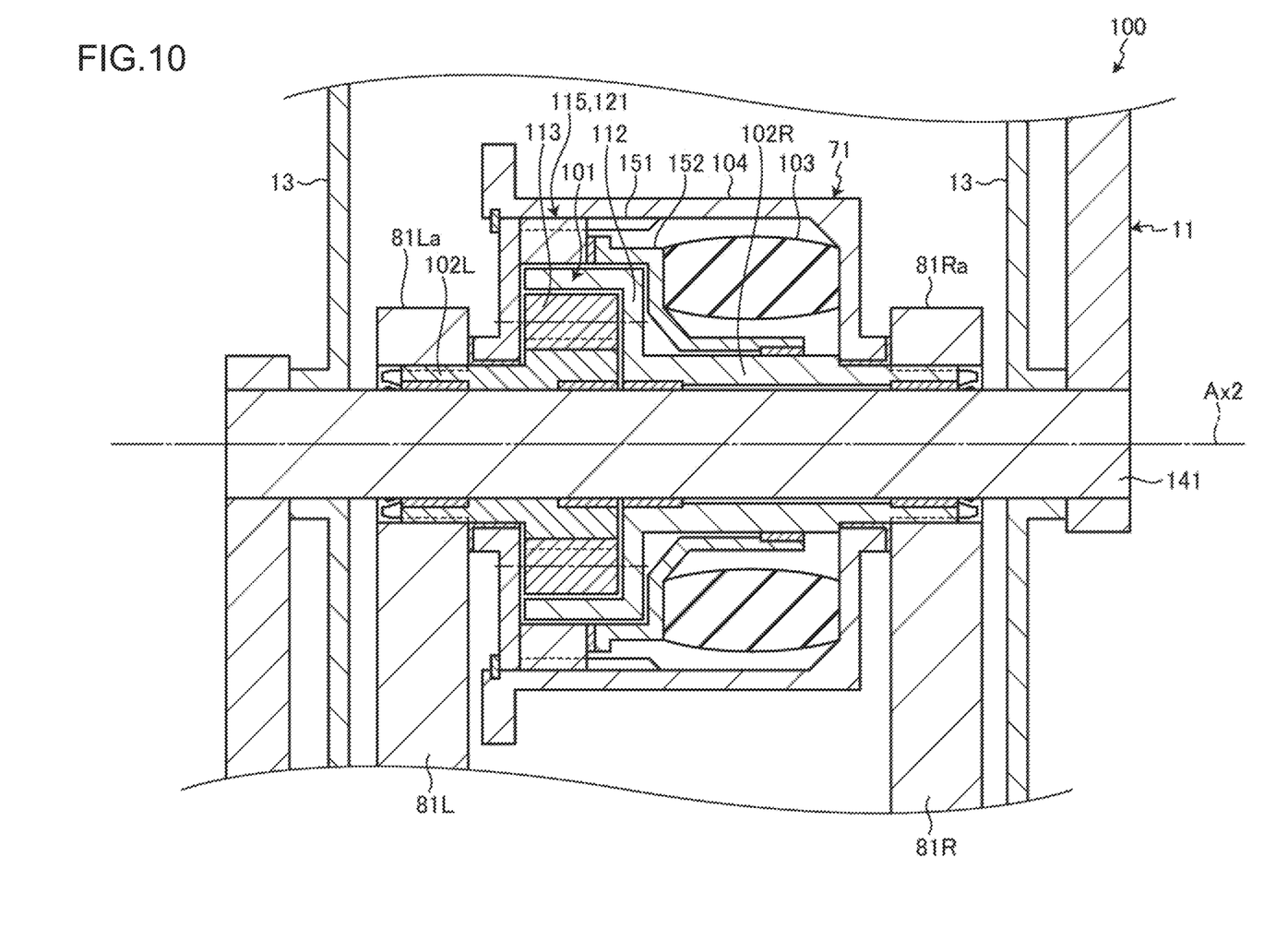
FIG. 10 is an exemplary and schematic cross-sectional view showing a wheel support device according to a fifth embodiment.

FIG. 10 is an exemplary and schematic cross-sectional view showing a wheel support device according to a fifth embodiment. The present embodiment is mainly different from the fourth embodiment in the motion conversion mechanism 121 and the elastic member 122.

The motion conversion mechanism 121 according to the present embodiment includes a support portion 151 and the ring gear 115. The support portion 151 is a female screw portion (helical spline) provided in the case 104. A male screw portion (helical spline) that meshes with the support portion 151 is provided on an outer peripheral portion of the ring gear 115. A pressing member 152 is interposed between the ring gear 115 and the elastic member 122. The elastic member 122 is made of, for example, rubber, and the preload is set. In the above configuration, when the ring gear 115 rotates in one direction, the ring gear 115 is guided by the support portion 151 and moves to one side in the axial direction, and presses the elastic member 122 via the pressing member 152 and causes the elastic member 122 to be compressed. The ring gear 115 is an example of a linear motion member.

Sixth Embodiment

Figure 11:
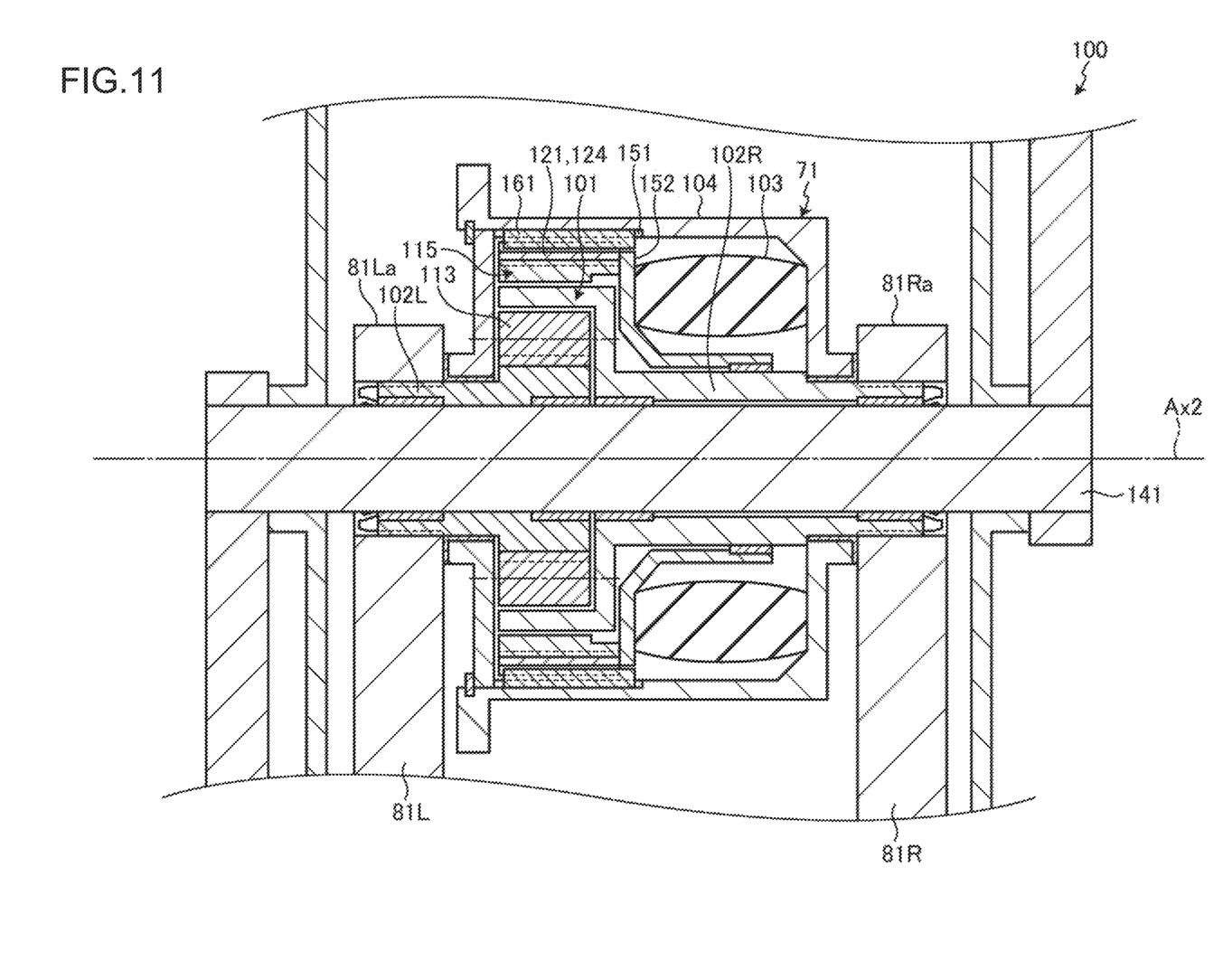
FIG. 11 is an exemplary and schematic cross-sectional view showing a wheel support device according to a sixth embodiment.
Figure 12:
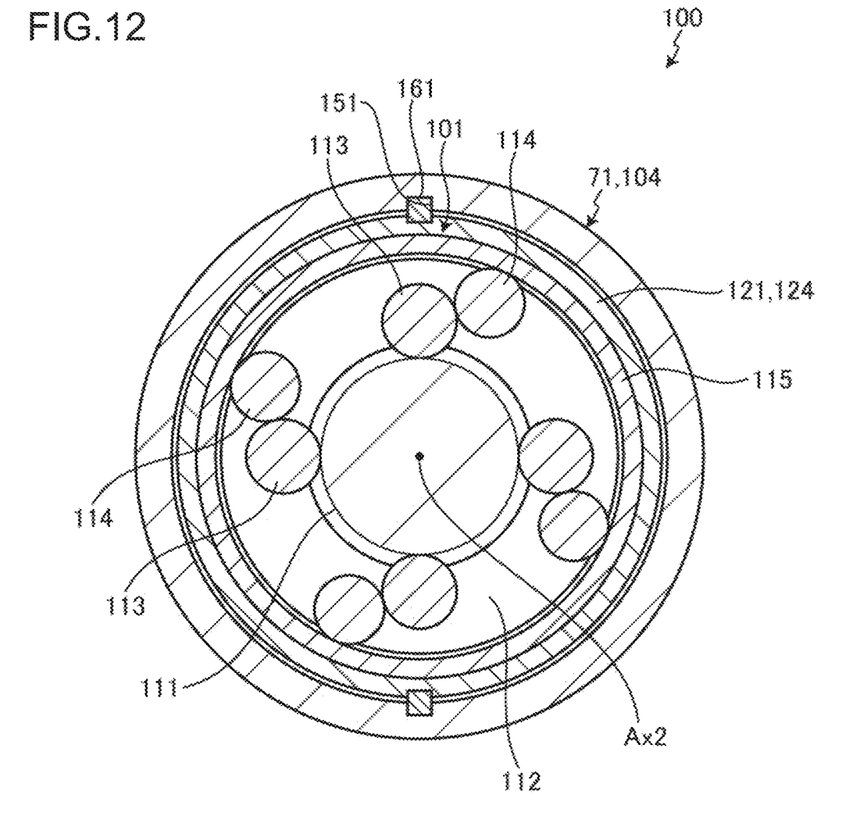
FIG. 12 is an exemplary and schematic cross-sectional view showing the wheel support device according to the sixth embodiment.

FIG. 11 is an exemplary and schematic cross-sectional view showing a wheel support device according to a sixth embodiment. FIG. 12 is an exemplary and schematic cross-sectional view showing the wheel support device according to the sixth embodiment. The present embodiment is different from the fifth embodiment in the motion conversion mechanism 121. In the present embodiment, the linear motion member 124 meshes with the male screw portion on the outer peripheral portion of the ring gear 115. The linear motion member 124 is supported by the support portion 151 via an interposing member 161. The support portion 151 is provided on an inner peripheral portion of the case 104. The support portion 151 is formed in a concave shape and extends in the axial direction. In the above configuration, when the ring gear 115 rotates in one direction, the linear motion member 124 is guided by the support portion 151 via the interposing member 161 and moves to one side in the axial direction, and presses the elastic member 122 via the pressing member 152 and causes the elastic member 122 to be compressed. In the present embodiment, no female screw portion is provided in the support portion 151.

According to an aspect of this disclosure, a wheel support device includes: a planetary gear mechanism including a first rotating element rotatable about a rotation center axis, a second rotating element rotatable about the rotation center axis and configured to rotate in a reverse direction of the first rotating element, and a reaction force element configured to generate a reaction force against inputs from the first rotating element and the second rotating element; a first arm member including a first base end portion coupled to the first rotating element and a first tip end portion rotatably supporting a first wheel of a vehicle, and configured to rotate integrally with the first rotating element about the rotation center axis; and a second arm member including a second base end portion coupled to the second rotating element and a second tip end portion rotatably supporting a second wheel of the vehicle, and configured to rotate integrally with the second rotating element about the rotation center axis.

According to the wheel support device disclosed here, it is possible to prevent an increase in size of the wheel support device.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A wheel support device comprising:
   a planetary gear mechanism including a first rotating element rotatable about a rotation center axis, a second rotating element rotatable about the rotation center axis and configured to rotate in a reverse direction of the first rotating element, and a reaction force element configured to generate a reaction force against inputs from the first rotating element and the second rotating element;
   a first arm member including a first base end portion coupled to the first rotating element and a first tip end portion rotatably supporting a first wheel of a vehicle, and configured to rotate integrally with the first rotating element about the rotation center axis; and
   a second arm member including a second base end portion coupled to the second rotating element and a second tip end portion rotatably supporting a second wheel of the vehicle, and configured to rotate integrally with the second rotating element about the rotation center axis.

2. The wheel support device according to claim 1, further comprising:
   a reaction force mechanism, wherein
   the reaction force element rotates about the rotation center axis in conjunction with the rotation of the first rotating element and the second rotating element, and
   the reaction force mechanism includes
      a linear motion member configured to linearly move in an axial direction of the rotation center axis in accordance with the rotation of the reaction force element, and
      an elastic member configured to generate a reaction force in accordance with the linear motion of the linear motion member.

3. The wheel support device according to claim 2, wherein
   the reaction force mechanism has a tubular shape about the rotation center axis and includes a tubular member that rotates integrally with the reaction force element, and
   the linear motion member is connected to the reaction force element via the tubular member and linearly moves in the axial direction of the rotation center axis in accordance with the rotation of the tubular member and the reaction force element.

4. The wheel support device according to claim 2, wherein a preload is set for the elastic member, and
when a rotational torque input to the reaction force element is less than a threshold, the linear motion member is stopped by an elastic force of the elastic member, and when the rotational torque input to the reaction force element is equal to or greater than the threshold, the linear motion member linearly moves.

5. The wheel support device according to claim 1, wherein the first rotating element is a sun gear, and
the second rotating element is a planetary carrier.

* * * * *